United States Patent

Blackburn et al.

[11] Patent Number: 6,060,858
[45] Date of Patent: May 9, 2000

[54] C-DUMP SWITCHED RELUCTANCE HYSTERESIS CONTROL

[75] Inventors: Scott E. Blackburn, Temperance; Ramani R. Kalpathi, Ann Arbor, both of Mich.

[73] Assignee: Dana Corporation, Toledo, Ohio

[21] Appl. No.: 09/135,828

[22] Filed: Aug. 18, 1998

[51] Int. Cl.[7] ................................. H02P 7/05; H02P 7/36
[52] U.S. Cl. ......................... 318/701; 318/254; 318/492; 318/678
[58] Field of Search .................................. 318/701–830, 318/492, 254, 138; 363/132, 98, 64; 361/90, 91, 92; 340/662, 663

[56] References Cited

U.S. PATENT DOCUMENTS

| | | | |
|---|---|---|---|
| 4,719,402 | 1/1988 | Brennen et al. | 323/211 |
| 4,804,892 | 2/1989 | Muller | 318/254 |
| 4,879,625 | 11/1989 | Potenzone | 361/90 |
| 4,933,621 | 6/1990 | MacMinn et al. | 318/696 |
| 5,166,591 | 11/1992 | Stephens et al. | 318/701 |
| 5,350,990 | 9/1994 | Austermann et al. | 318/701 |
| 5,424,624 | 6/1995 | Senak, Jr. | 318/701 |
| 5,446,359 | 8/1995 | Horst | 318/701 |
| 5,461,295 | 10/1995 | Horst | 318/701 |
| 5,530,333 | 6/1996 | Turner | 318/701 |
| 5,548,196 | 8/1996 | Lim | 318/701 |
| 5,559,416 | 9/1996 | Hrassky | 318/678 |
| 5,589,752 | 12/1996 | Iwasaki et al. | 318/701 |
| 5,610,545 | 3/1997 | Jenkins et al. | 327/205 |
| 5,617,050 | 4/1997 | Jenkins et al. | 327/205 |
| 5,691,856 | 11/1997 | Kardash | 360/73.03 |
| 5,736,826 | 4/1998 | Hrassky | 318/678 |
| 5,783,916 | 7/1998 | Blackburn | 318/254 |
| 5,861,727 | 1/1999 | Blackburn et al. | 318/701 |

OTHER PUBLICATIONS

"Development of a Unipolar Converter for Variable Reluctance Motor Drives", Mehrdad Ehsani, James T. Bass, Timothy J.E. Miller, and Robert L. Steigerwald, IEEE Transactions on Industry Applications, vol. IA–23, No. 3, pp. 545–552, May/Jun. 1987.

*Primary Examiner*—Paul Ip
*Attorney, Agent, or Firm*—Dykema Gossett PLLC

[57] ABSTRACT

A circuit and method for controlling a switched reluctance motor are provided. The circuit includes a phase coil and a switch that controls a current in the phase coil responsive to a hysteresis control signal. The circuit also includes a current sensor that measures the level of current in the phase coil and a comparator that compares the measured current level to a predetermined upper hysteresis current level. The circuit further includes a hysteresis control signal generating circuit that generates the hysteresis control signal responsive to the comparison signal and a timing signal that comprises a series of timing pulses. The hysteresis control signal assumes a first logic level whenever the measured level of current in the phase coil exceeds the predetermined upper hysteresis current level, thereby opening the switch and allowing current to dissipate from the phase coil. The control signal subsequently assumes a second logic level on the rising edge of the next timing pulse in the timing signal, thereby closing the switch and allowing the level of current in the phase coil to increase.

19 Claims, 3 Drawing Sheets

C-DUMP SWITCHED RELUCTANCE HYSTERESIS CONTROL

BACKGROUND OF THE INVENTION

1. Field of the Invention

This invention relates to switched reluctance motors, and, more particularly, to a method and a circuit for controlling a switched reluctance motor by hysteresis control of the current in each motor phase of the switched reluctance motor.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

Conventional SRMs have employed various forms of hysteresis control in order to control the current level in each phase coil during the active stage of each motor phase. In general, however, hysteresis control has been implemented using relatively expensive switching topologies and control circuits. Moreover, conventional circuits and methods for hysteresis current control have often incorporated microprocessors. The use of microprocessors is disadvantageous because it increases the cost of the motor and limits the bandwidth of electrical signals within the control system for the motor.

There is thus a need for a circuit and method for controlling a switched reluctance motor that will minimize or eliminate one or more of the above-mentioned deficiencies.

SUMMARY OF THE INVENTION

The present invention provides a circuit and a method for controlling a switched reluctance motor.

An object of the present invention is to provide a circuit and method for controlling a switched reluctance motor that are less expensive than conventional control circuits and methods.

Another object of the present invention is to provide a circuit and a method for controlling a switched reluctance motor that allow for a greater bandwidth for electrical signals within the control system of the motor.

Yet another object of the present invention is to provide a circuit and a method for controlling a switched reluctance motor that allow hysteresis control of the current in the phase coils of the motor using a relatively inexpensive switching topology.

A circuit for controlling a switched reluctance motor in accordance with the present invention includes a phase coil and a switch that controls a current in the phase coil responsive to a hysteresis control signal. The circuit also includes a current sensor—such as sensing resistor—that generates a current indicative signal indicative of a level of current in the phase coil and a comparator that generates a comparison signal responsive to the current indicative signal and a hysteresis band limit signal. The hysteresis band limit signal represents a predetermined upper limit for the current in the phase coil. The circuit further includes a hysteresis control signal generating circuit that generates the above-mentioned hysteresis control signal responsive to the comparison signal and a timing signal that comprises a plurality of timing pulses. In particular, the hysteresis control signal assumes a first logic level whenever the comparison signal indicates that the current level in the phase coil has exceeded a predetermined upper current level represented by the hysteresis band limit signal. This action causes the switch to open and allows current within the phase coil to dissipate, thereby lowering the current level in the phase coil. The hysteresis control signal subsequently assumes a second logic level on the rising edge of the next timing pulse within the timing signal. The action causes the switch to once again close and allows current to again be supplied to the phase coil, thereby increasing the current level in the phase coil.

A method for controlling a switched reluctance motor in accordance with the present invention includes the step of measuring a level of current in a phase coil of the motor. The method also includes the step of comparing the level of current in the phase coil to a predetermined current level and generating a comparison signal in response thereto. The method further includes the step of generating a hysteresis control signal responsive to the comparison signal and a timing signal, wherein the timing signal comprises a plurality of timing pulses having predetermined time periods. Finally, the method includes the step of controlling the current in the phase coil responsive to the hysteresis control signal.

A circuit and method in accordance with the present invention represent an analog implementation of a hysteresis current control strategy for the active stage of an SRM motor phase. Because the circuit and method do not require the use of a microprocessor, the SRM and the control circuitry for the SRM are less expensive than conventional motors and motor controls. Moreover, because the inventive circuit and method do not require the use of a microprocessor, the electrical signals within the control system for the motor can operate within a greater bandwidth than is possible with conventional control circuits.

A circuit and method in accordance with the present invention also represent an improvement over the prior art because the inventive circuit and method are adapted for use with a relatively inexpensive switching topology known as the "C-Dump" topology. Hysteresis control circuits and methods have typically been implemented using switching topologies that include at least two switches in each motor phase to control current in the respective motor phase coil. The C-Dump topology utilizes only one switch to control the current in each respective phase coil. Accordingly, the C-Dump topology is less expensive to implement than many conventional switching topologies. Because the inventive circuit and method is adapted for use with the C-Dump switching topology, a motor incorporating the inventive circuit and using the inventive method will be able to employ a less expensive switching topology and yet retain the advantages of hysteresis current control.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
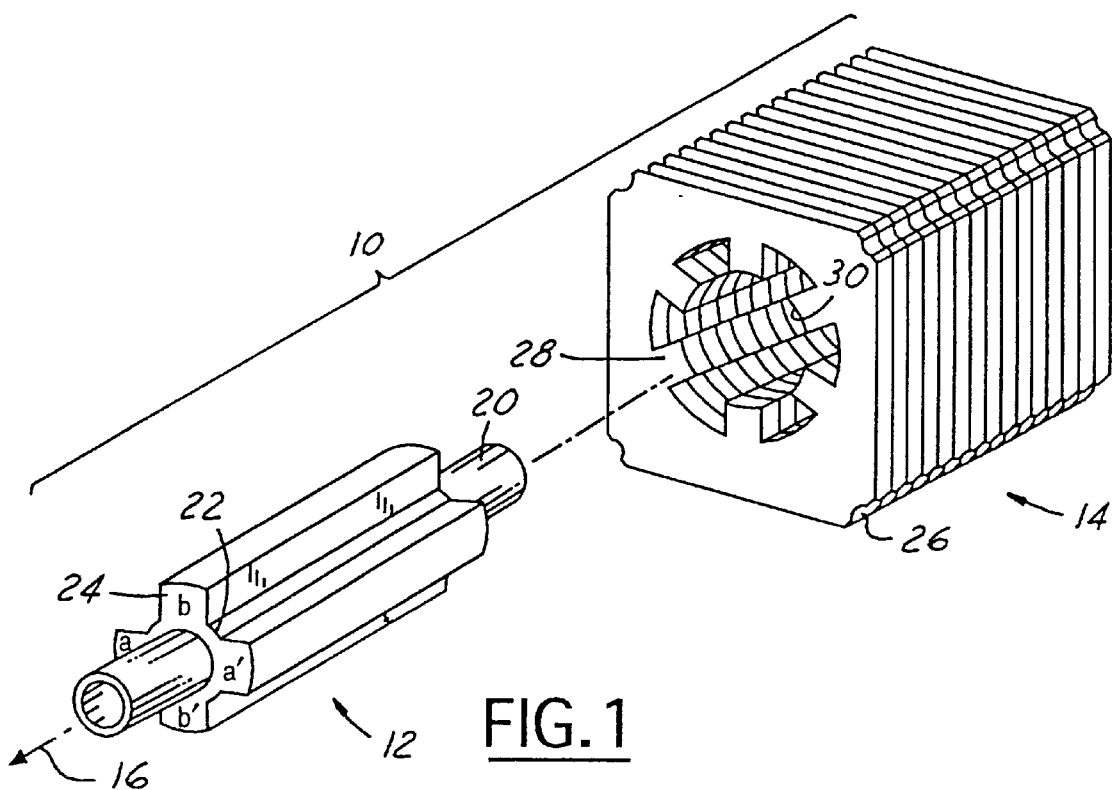
FIG. 1 is an exploded perspective view of a conventional switched reluctance motor.
Figure 2:
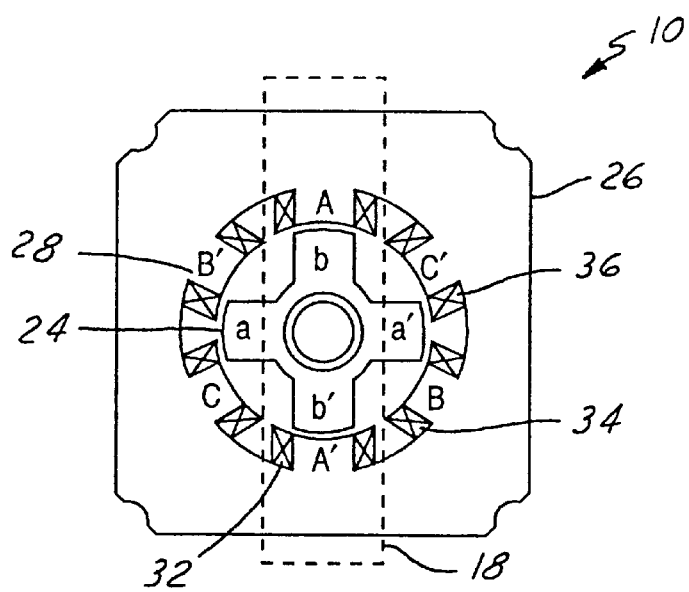
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'.

Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32, 34, 36 surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction cycles in phase coils surrounding consecutive stator pole pairs, a relatively constant torque can be produced.

Figure 3:
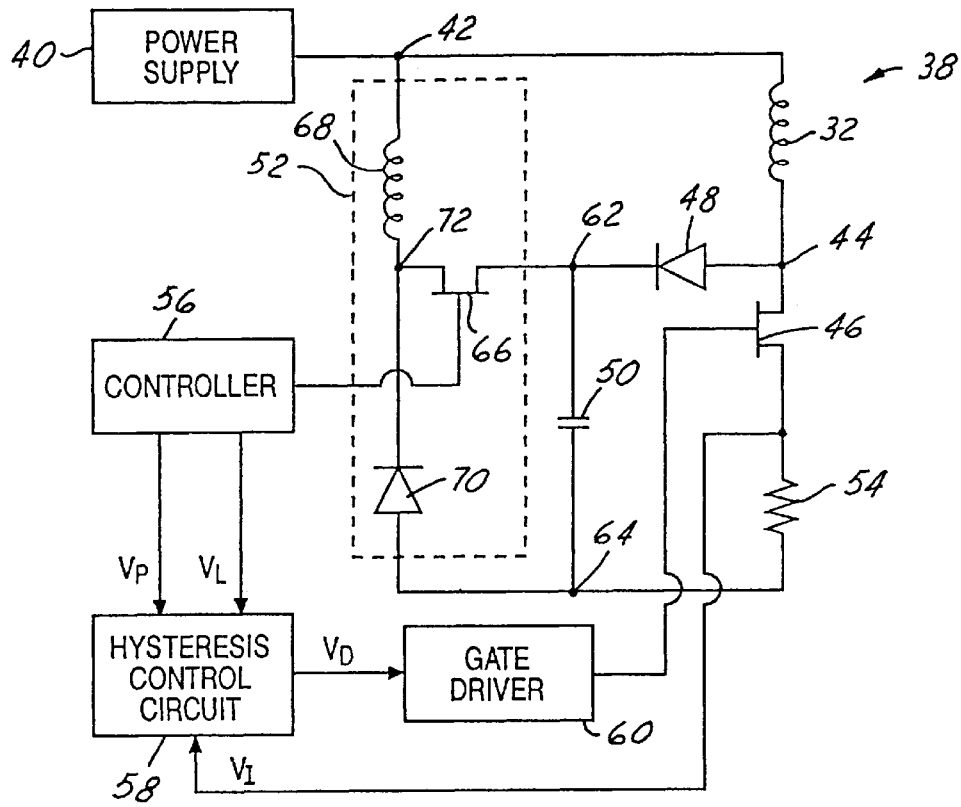
FIG. 3 is a combination schematic and block diagram illustrating a circuit in accordance with the present invention.

Referring now to FIG. 3, a circuit 38 for controlling motor 10 in accordance with the present invention is illustrated. Circuit 38 may include a phase coil 32 having a first end connected to a power supply 40 through a node 42 and a second end connected to a node 44. Circuit 38 may also include a switch 46 for controlling a current in phase coil 32 of motor 10, a diode 48, means, such as capacitor 50, for storing energy dissipated from coil 32, and a recovery circuit 52 that returns the energy stored by capacitor 50 to power supply 40. These components form a conventional C-Dump switching topology for motor 10. The C-Dump switching topology is advantageous because it uses a single switch (i.e., switch 46) to control the current level in the phase coil and is therefore relatively inexpensive as compared to other conventional switching topologies. In accordance with the present invention, circuit 38 may further include a current sensor, such as sensing resistor 54, a controller 56, a hysteresis control circuit 58, and a conventional gate driver 60. Circuit 38 represents an equivalent circuit for one motor phase 18 of motor 10. It should be understood, however, that portions of circuit 38, such as capacitor 50, recovery circuit 52, and controller 56, may form part of additional motor phases 18.

Switch 46 is provided to control a current in coil 32 responsive to a hysteresis control signal generated within hysteresis control circuit 58. Switch 46 is conventional in the art and may take any of a plurality of forms well known in the art. For example, switch 46 may comprise a MOSFET. Switch 46 may be disposed between sensing resistor 54 and node 44.

Diode 48 is provided to direct the current, or electrical energy, that dissipates from coil 32 when switch 46 is opened to capacitor 50. Diode 48 is conventional in the art. Diode 48 may have an anode connected to node 44 and a cathode connected to a node 62.

Capacitor 50 is provided to store the electrical energy dissipated from coil 32 when switch 46 is opened. Capacitor 50 is conventional in the art and may have a first plate connected to node 62 and a second plate connected to a node 64.

Recovery circuit 52 is provided to return the energy stored in capacitor 50 to power supply 40. Circuit 52 may include a switch 66, a coil 68, and a diode 70. Switch 66 is provided to discharge energy stored in capacitor 50 into coil 68 and is connected between node 62 and a node 72. Switch 66 is conventional in the art and may take on any of a plurality of forms well known in the art. For example, switch 66 may comprise a MOSFET. Coil 68 is provided to store the energy discharged from capacitor 50 and is also conventional in the art. Coil 68 may have a first end connected to power supply 40 at node 42 and a second end connected to node 72. Diode 70 is provided to direct the energy stored in coil 68 to power supply 40 and is also conventional in the art. Diode 70 may have an anode connected to node 64 and a cathode connected to node 72. Switch 66 is controlled by a control signal generated by controller 56. Closing switch 66 causes the energy stored in capacitor 50 to discharge into coil 68. Thereafter, opening switch 66 causes the energy stored in coil 68 to freewheel throughout circuit 38 and return to power supply 40.

Sensing resistor 54 is provided to measure a level of current in coil 32 and generates a current indicative signal $V_I$ that is indicative of the level of current in coil 32. Resistor 54 is conventional in the art. Resistor 54 is connected in series with switch 46 and has one end connected to node 64. It should be understood by those skilled in the art that sensing resistor 54 represents just one possible current sensor for use in the present invention. A variety of current sensors could be employed in the present invention, including, for example, Hall effect current sensors.

Controller 56 is provided to initiate and commutate the conduction cycle in each motor phase 18 of motor 10. Controller 56 is also provided to control recovery circuit 52. Finally, controller 56 may also be provided to generate a hysteresis band limit signal $V_L$ indicative of a predetermined upper current level for coil 32. Controller 56 is conventional in the art and may comprise either discrete circuits or a programmable microcontroller. Controller 56 initiates and commutates conduction cycles in each of the motor phases 18 by generating phase control signals that are used to control switches in each motor phase 18. In the illustrated embodiment, controller 56 generates a phase control signal $V_P$ that is supplied to hysteresis control circuit 58. As described in greater detail hereinbelow, circuit 58 generates a drive signal $V_D$, responsive to phase control signal $V_P$, that is used to control switch 46 and the current in coil 32. Controller 56 controls recovery circuit 52 by generating a control signal used to selectively open and close switch 66 of recovery circuit 52.

Figure 4:
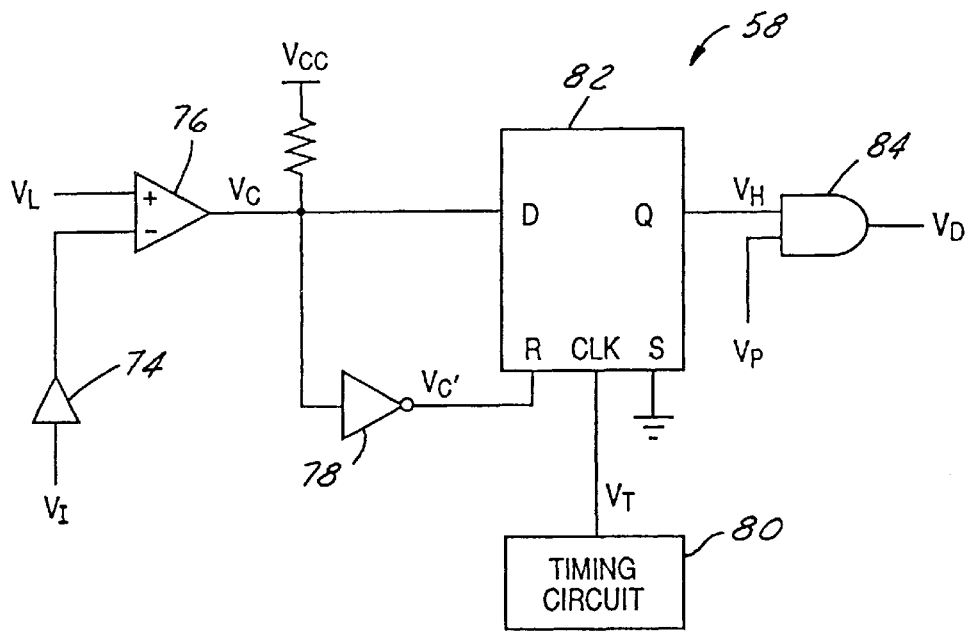
FIG. 4 is a combination schematic and block diagram illustrating the hysteresis control circuit block of FIG. 3.

Referring now to FIG. 4, hysteresis control circuit 58 will be described in greater detail. Hysteresis control circuit 58 provides a form of hysteresis current control within each motor phase 18 of motor 10. In particular, circuit 58 generates a drive signal $V_D$ that is used to control switch 46 and provide hysteresis current control within coil 32. Circuit 58 may include an amplifier 74, a comparator 76, a logic gate 78, a timing circuit 80, a hysteresis control signal generating circuit 82 and a logic gate 84.

Amplifier 74 is provided to amplify the current indicative signal $V_I$ generated by sensing resistor 54. Amplifier 74 is conventional in the art.

Comparator 76 is provided to compare current indicative signal $V_I$ to a hysteresis band limit signal $V_L$. Comparator 76 is conventional in the art. The positive input of comparator 76 receives hysteresis band limit signal $V_L$ from controller 56. The negative input of comparator 76 receives current indicative signal $V_I$ from amplifier 74. Comparator 76 outputs a comparison signal $V_C$ indicative of whether the level of current in coil 32—represented by current indicative signal $V_I$—is less than or greater than a predetermined upper hysteresis band current limit—represented by hysteresis band limit signal $V_L$.

Logic gate 78 is provided to invert comparison signal $V_C$ to thereby obtain an inverted comparison signal $V_{C'}$. Gate 78 is conventional in the art and comprises an inverter in the illustrated embodiment. It should be understood, however, that other gate configurations may be implemented without departing from the spirit of the present invention.

Timing circuit 80 is provided to generate a timing signal $V_T$ comprising a plurality of timing or clock pulses. Timing circuit 80 is conventional in the art and supplies timing signal $V_T$ to hysteresis control signal generating circuit 82. Each of the timing pulses forming timing signal $V_T$ may have a predetermined period.

Hysteresis control signal generating circuit 82 is provided to generate a hysteresis control signal $V_H$ that is used for hysteresis control of the current in coil 32. Circuit 82 is conventional in the art and may comprise a D flip-flop—and, in particular, an edge-triggered D flip-flop having a direct clear. Circuit 82 receives comparison signal $V_C$, inverted comparison signal $V_{C'}$, and timing signal $V_T$ as inputs and generates hysteresis control signal $V_H$ as an output. Comparison signal $V_C$ is provided to the D input of circuit 82. Inverted comparison signal $V_{C'}$ is provided to the R input of circuit 82 and may function as a direct clear as described in greater detail hereinbelow. Timing signal $V_T$ is provided to the CLK input of circuit 82 and may function as the edge-trigger that latches the value of comparison signal $V_C$ through to the output of circuit 82 (i.e. as hysteresis control signal $V_H$). The S input of circuit 82 may be connected to ground.

Logic gate 84 is provided to ensure that switch 46 is only closed during the conduction interval for each motor phase 18. Gate 84 is conventional in the art and may comprise an AND gate. Gate 84 generates a drive signal $V_D$ responsive to hysteresis control signal $V_H$ and phase control signal $V_P$ such that switch 46 is only closed during the conduction interval for motor phase 18. It should be understood that other gate configurations may be implemented without departing from the spirit of the present invention. It should also be understood that gate 84 could be removed from circuit 58 and switch 46 made directly responsive to hysteresis control signal $V_H$ (as opposed to indirectly responsive to hysteresis control signal $V_H$ through drive signal $V_D$).

Referring now to FIGS. 3, 4, and 5A–H, a method in accordance with the present invention will be illustrated. A method in accordance with the present invention may include the step of measuring a level of current in coil 32. This step may include the substeps of generating a current indicative signal $V_I$ (shown in FIG. 5C) indicative of a level of current in coil 32 and amplifying current indicative signal $V_I$. As mentioned hereinabove, current indicative signal $V_I$ may be generated by sensing resistor 54 and amplified by amplifier 74.

A method in accordance with the present invention may also include the step of comparing the level of current in coil 32 to a predetermined current level and generating a comparison signal in response thereto. This step may include the substeps of generating a hysteresis band limit signal $V_L$, comparing the current indicative signal with hysteresis band limit signal $V_L$, and generating comparison signal $V_C$ (shown in FIG. 5D) responsive thereto. As mentioned hereinabove, limit signal $V_L$ may be generated by controller 56. Limit signal $V_L$ may be compared to current indicative signal $V_I$—and comparison signal $V_C$ generated—using comparator 76.

A method in accordance with the present invention may further include the step of generating a hysteresis control signal $V_H$ responsive to comparison signal $V_C$ and timing signal $V_T$. This step may include the substeps of inverting comparison signal $V_C$ to obtain an inverted comparison signal $V_{C'}$ (shown in FIG. 5E), generating a timing signal $V_T$ (shown in FIG. 5F), providing comparison signal $V_C$, inverted comparison signal $V_{C'}$, and timing signal $V_T$ to hysteresis control signal generating circuit 82, and generating hysteresis control signal $V_H$ in response thereto.

As mentioned hereinabove, comparison signal $V_C$ may be inverted to obtain inverted comparison signal $V_{C'}$ using logic gate 78. Referring now to FIGS. 5D and 5E, inverted comparison signal $V_{C'}$ assumes a high logic level whenever comparison signal $V_C$ assumes a low logic level. In other words, inverted comparison signal $V_{C'}$ assumes a high logic level whenever the current in coil 32—as indicated by current indicative signal $V_I$—exceeds a predetermined upper current level—as represented by hysteresis band limit signal $V_L$.

Also as mentioned hereinabove, timing signal $V_T$ may be generated by timing circuit 80. As shown in FIG. 5F, timing signal may comprise a plurality of timing pulses—each of which may extend for a predetermined time period t.

Figure 5A:
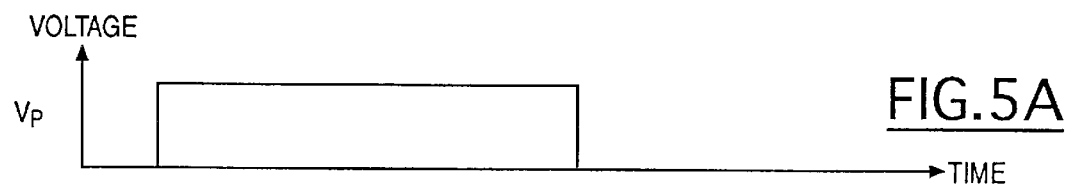
FIGS. 5A–H are timing diagrams illustrating voltage and current levels in the circuit of FIG. 3 over time.
Figure 5B:
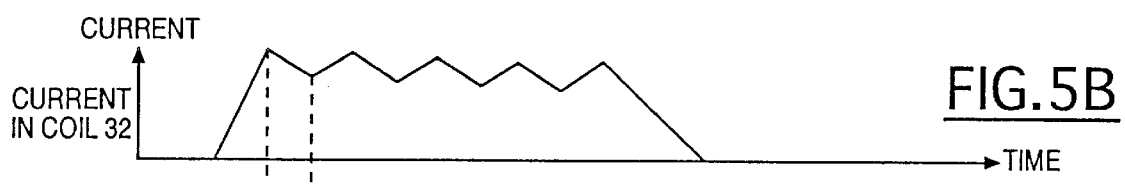
Figure 5C:
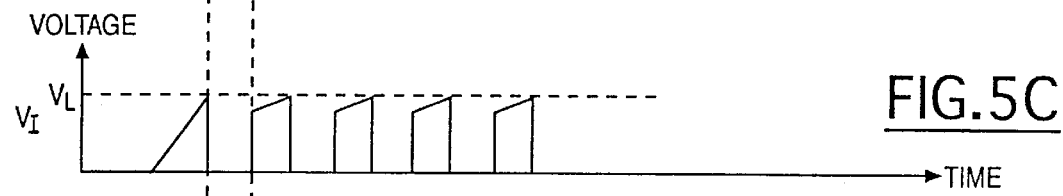
Figure 5D:
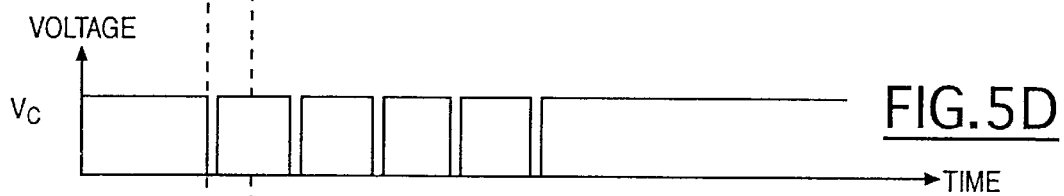
Figure 5E:
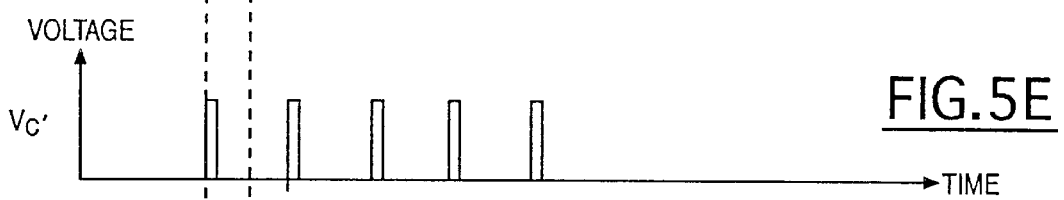
Figure 5F:
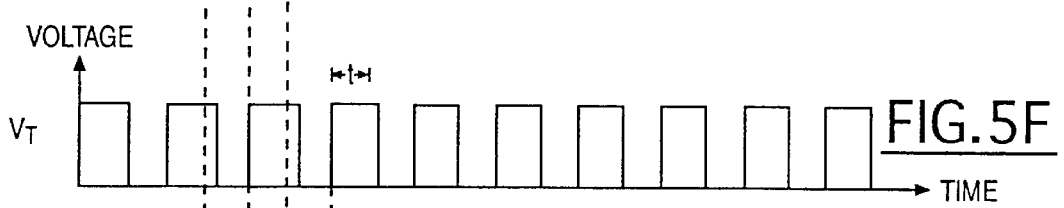
Figure 5G:

Referring now to FIGS. 5B–G, hysteresis control signal $V_H$ is generated responsive to comparison signal $V_C$ and timing signal $V_T$ (inverted comparison signal $V_{C'}$ being a function of comparison signal $V_C$). As shown in FIGS. 5B and 5C, the current in coil 32 during a conduction interval increases until the current reaches a predetermined upper current limit represented by limit signal $V_L$. At this point, comparison signal $V_C$ transitions to a low logic level (as shown in FIG. 5D) and inverted comparison signal $V_{C'}$ transitions to a high logic level (as shown in FIG. 5E). As mentioned hereinabove, inverted comparison signal $V_{C'}$ acts as a direct clear to circuit 82. Therefore, the output of circuit 82—hysteresis control signal $V_H$—transitions to a low logic level (as shown in FIG. 5G) in response to the transition of inverted comparison signal $V_{C'}$ to a high logic level.

Figure 5H:
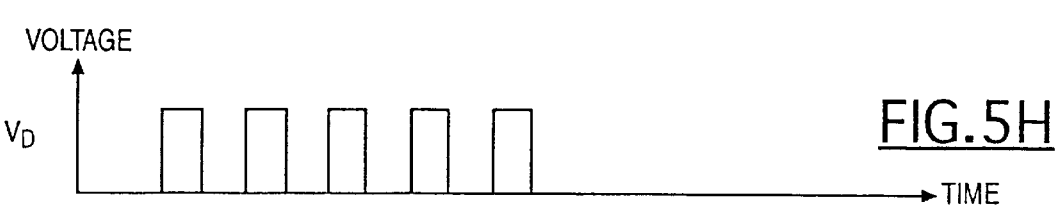

Hysteresis control signal $V_H$ remains at the low logic level until the rising edge of the next timing pulse in timing signal $V_T$ triggers circuit 82 to latch comparison signal $V_C$ through to its output. As shown in FIG. 5D, comparison signal $V_C$ transitions to a high logic level once the current in coil 32 has decreased below the predetermined current level represented by limit signal $V_L$. As mentioned hereinabove, timing signal $V_T$ is provided to the CLK input of circuit 82 and acts as a trigger to latch the value of comparison signal $V_C$ through to the output—hysteresis control signal $V_H$—of circuit 82. As shown in FIG. 5H, because comparison signal $V_C$ has returned to a high logic level, hysteresis control signal $V_H$ assumes a high logic level on the rising edge of the timing pulse in timing signal $V_T$.

A method in accordance with the present invention may further include the step of controlling the current in coil 32 responsive to hysteresis control signal $V_H$. This step may include the substeps of generating a drive signal $V_D$ responsive to hysteresis control signal $V_H$ and phase control signal $V_P$ and controlling switch 46 responsive to drive signal $V_D$. As mentioned hereinabove, drive signal $V_D$ may be generated by logic gate 84 responsive to hysteresis control signal $V_H$ and phase control signal $V_P$. Drive signal $V_D$ may then be provided to switch 46 to ensure that current is only provided to coil 32—and hysteresis current control implemented—during the conduction interval for motor phase 18.

A method in accordance with the present invention may finally include the steps of storing energy dissipated from coil 32 and returning the stored energy to a power supply. As shown in FIG. 3 and as mentioned hereinabove, capacitor 50 may be used to store the electrical energy dissipated from coil 32 when switch 46 is opened. Recovery circuit 52 may then be used to direct the stored energy back to power supply 40.

A circuit and a method in accordance with the present invention represent an improvement over conventional means for controlling a switched reluctance motor because the inventive circuit and method do not require the use of a microprocessor to control current during the active stage of each motor phase of the motor. As a result, a circuit in accordance with the present invention, and any motor that incorporates the circuit or uses a method in accordance with the present invention, will be less expensive as compared to conventional control circuits and motors. Moreover, because the use of microprocessors limits the operating bandwidth for electrical signals within the control circuit, a circuit and method in accordance with the present invention allow for a greater operating bandwidth for electrical signals within the motor's control system. Finally, a circuit and method in accordance with the present invention incorporate, and are adapted for use with, a relatively inexpensive switching topology known as the "C-Dump" topology. Conventional circuits and methods for implementing hysteresis control have incorporated more expensive switching topologies—generally including at least two switches per motor phase.

While the invention has been particularly shown and described with reference to the preferred embodiments thereof, it is well understood by those skilled in the art that various changes and modifications can be made in the invention without departing from the spirit and scope of the invention.

We claim:

1. A circuit for controlling a motor, comprising:
   a phase coil;
   a current sensor that generates a current indicative signal indicative of a level of current in said phase coil;
   a comparator that generates a comparison signal responsive to said current indicative signal and a hysteresis band limit signal;
   a hysteresis control signal generating circuit that generates a hysteresis control signal responsive to said comparison signal and a timing signal said timing signal comprises a plurality of timing pulses having predetermined periods; and,
   a first switch that controls a current in said phase coil responsive to said hysteresis control signal.

2. The circuit of claim 1, further comprising a timing circuit that generates said timing signal.

3. The circuit of claim 1, further comprising a logic gate that generates a drive signal responsive to said hysteresis control signal and a phase control signal.

4. The circuit of claim 1 wherein said current sensor comprises a sensing resistor.

5. The circuit of claim 1 wherein said hysteresis control signal generating circuit comprises a D flip-flop.

6. The circuit of claim 1 wherein said hysteresis control signal assumes a first logic level when said comparison signal transitions between a first pair of logic levels and said hysteresis control signal assumes a second logic level when said timing signal transitions between a second pair of logic levels.

7. A circuit for controlling a motor, comprising:
   a phase coil having a first end connected to a power supply;
   a current sensor that generates a current indicative signal indicative of a level of current in said phase coil;

a comparator that generates a comparison signal responsive to said current indicative signal and a hysteresis band limit signal;

a hysteresis control signal generating circuit that generates a hysteresis control signal responsive to said comparison signal and a timing signal;

a first switch connected to a second end of said phase coil and responsive to said hysteresis control signal for controlling a current in said phase coil;

means for storing energy dissipated by said phase coil; and, a recovery circuit that returns said stored energy to said power supply.

8. The circuit of claim 7, further comprising a timing circuit that generates said timing signal.

9. The circuit of claim 8, further comprising a logic gate that generates a drive signal responsive to said hysteresis control signal and a phase control signal.

10. The circuit of claim 7 wherein said current sensor comprises a sensing resistor.

11. The circuit of claim 7 wherein said hysteresis control signal generating circuit comprises a D flip-flop.

12. The circuit of claim 7 wherein said timing signal comprises a plurality of timing pulses having predetermined periods.

13. The circuit of claim 7 wherein said energy storage means comprises a capacitor.

14. The circuit of claim 7 wherein said recovery circuit comprises:

a coil; and a second switch connected to said coil and said energy storage means for selectively discharging energy from said energy storage means to said coil.

15. The circuit of claim 1 wherein said hysteresis control signal assumes a first logic level when said comparison signal transitions between a first pair of logic levels and said hysteresis control signal assumes a second logic level when said timing signal transitions between a second pair of logic levels.

16. A method for controlling a motor, comprising the steps of:

measuring a level of current in a phase coil;

comparing said level of current in said phase coil to a predetermined current level and generating a comparison signal in response thereto;

generating a hysteresis control signal responsive to said comparison signal and a timing signal, said timing signal comprising a plurality of timing pulses having predetermined time periods; and controlling said current in said phase coil responsive to said hysteresis control signal.

17. The method of claim 16 wherein said hysteresis control signal assumes a first logic level when said comparison signal transitions between a first pair of logic levels and said hysteresis control signal assumes a second logic level when said timing signal transitions between a second pair of logic levels.

18. The method of claim 16 wherein said controlling step includes the substeps of:

generating a drive signal responsive to said hysteresis control signal and a phase control signal; and, controlling a switch connected to said phase coil responsive to said drive signal.

19. The method of claim 16, further comprising the steps of:

storing energy dissipated from said phase coil; and, returning said stored energy to a power supply.

* * * * *

UNITED STATES PATENT AND TRADEMARK OFFICE
CERTIFICATE OF CORRECTION

PATENT NO. : 6,060,858
DATED : May 9, 2000
INVENTOR(S) : Scott E. Blackburn
Ramani R. Kalpathi It is certified that error appears in the above-identified patent and that said Letters Patent is hereby corrected as shown below:

Column 8, line 44, please delete "comprises" and substitute --comprising--.

Column 9, line 16, please delete "8" and substitute --7--.

Signed and Sealed this

Twentieth Day of March, 2001

Attest:

NICHOLAS P. GODICI

*Attesting Officer*  *Acting Director of the United States Patent and Trademark Office*